Nov. 7, 1961 J. KURLAND 3,007,568
MAGNETIC KEY HOLDER
Filed July 3, 1958

INVENTOR
JACOB KURLAND
BY *Samuel J. Stoll*
ATTORNEY

United States Patent Office 3,007,568
Patented Nov. 7, 1961

3,007,568
MAGNETIC KEY HOLDER
Jacob Kurland, % Kurland Enterprises, Inc.,
327 Westview Ave., Leonia, N.J.
Filed July 3, 1958, Ser. No. 746,398
1 Claim. (Cl. 206—19.5)

This invention relates to a magnetic key holder.

It is frequently the case that automobile drivers lock themselves out of their automobiles, leaving their keys in the ignition locks. With no extra keys on their person, it becomes necessary to utilize the services of a locksmith to open the locked doors. When such services are not available, reentry may be gained in many cases by forcing the locks or prying the windows open or utilizing other forms of forceful entry.

The principal object of this invention is the provision of a magnetic key holder which may be used to secrete a spare key in a hidden but accessible location in or on an external portion or member of an automobile. Reference is here made, for example, to hidden portions of ferrous metal trim members such as grill-work, concealed parts of the body and chassis, and other normally hidden but reasonably accessible parts of the automobile.

The magnetic key holder herein described and claimed is designed to receive an automobile key (or any other key such as a garage key or a house key) and it is provided with magnetic means capable of attaching it to a ferrous metal surface. More specifically, this device comprises a plastic holder formed with one pocket for a magnet and a second pocket for a key. A suitable permanent magnet of the Alnico type is inserted into the first pocket, and said first pocket is closed to retain the magnet. Since the holder is made of sheet plastics, the pocket may be closed by welding or heat sealing means. The second pocket is provided with closure means which may be opened or closed at will. For example, it may consist of a flap and retaining means for holding the flap in closed position. Such retaining means may be a snap fastener or simply a loop provided in the holder proper to receive the flap.

An important feature of this device is its compact size, which enables it to fit into relatively small concealed parts of automobile bodies, chassis frames and other parts and accessories. The entire holder is barely larger than the key itself, although it may be made large enough to receive a plurality of keys, such as one for the automobile ignition, one for the automobile luggage compartment, one for the home and one for the garage.

Another important feature of the present device is its relatively light weight. The holder proper, exclusive of the magnet, weighs less than a conventional automobile key. In effect, therefore, all that the magnet need support is the weight of the key. This renders it possible for the magnet to securely anchor the holder and the key which it contains to a suitable part of an automobile and to resist the vibrations and jarring action or motion normally encountered on the road.

Equally important is the fact that the holder is relatively flexible and the magnet therein is a floating magnet, that is, it is not attached to the holder but rather is merely inserted therein. It has been found that the flexible holder absorbs jarring shocks, and since the magnet is free to float it remains relatively immune to such shocks and cannot be shaken loose from its metal anchorage under such conditions as are normally encountered on even rough roads. It has been found that a magnet securely attached to a rigid holder will shake loose under relatively slight jarring conditions.

Still another important feature of the present invention is the fact that it is very inexpensive to make, and the materials of which it is made are also relatively inexpensive. Consequently, the entire device may be sold at an extremely low price and even given away for advertising purposes.

The invention is illustrated in the accompanying drawing, in which.

Figure 1:
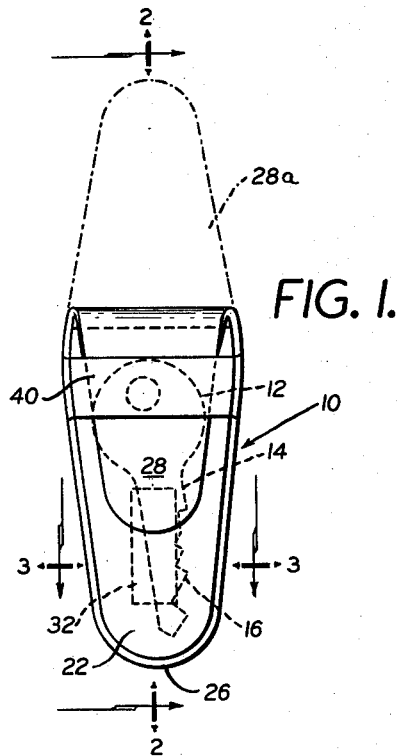
FIG. 1 is a front view of a magnetic key holder made in accordance with this invention.

Magnetic key holder 10 shown in the drawing is of generally elongated shape, tapered somewhat in plan view, to conform generally to the shape of a key. As shown in FIG. 1, the key holder is generally wider at the top to receive the larger end 12 of a typical automobile key 14, and narrower at the bottom to receive the serrated or operative portion 16 of the key. The configuration shown in the drawing is illustrative of a preferred design, but it should not be construed as limiting the invention to such design.

Holder 10 is provided with a back wall 20, a front wall 22, and an intermediate wall or partition 24. All three walls are secured to each other along their respective side edges by heat sealing means, cement or the like. The front and back walls may be integral with each other, as FIG. 2 clearly shows, being joined or continuous at the bottom edge or end of the holder by means of a bight 26.

Back wall 20 projects upwardly beyond front wall 22 to form a cover or flap portion 28. Inner wall 24 may be coextensive with the back wall and with its flap or cover portion 28.

It will now be observed that a pocket 30 is formed between the back and intermediate walls 20 and 24 and that disposed within said pocket is a permanent magnet 32. This may be a bar magnet, preferably cast to generally rectangular shape and made of the material known as Alnico. The pocket is closed off along all of its edges so as to securely hold the magnet and prevent any dislodgement thereof.

A second pocket 34 is formed between the front and intermediate walls 22 and 24 respectively. Said second pocket is closed at the sides and bottom but it is open at the top. When the cover or flap 28 is in its open position, as indicated by interrupted lines 28a and 28b in FIGS. 1 and 2 respectively, the second pocket is in open position to receive a key 14. The key may be inserted as shown in FIGS. 1 and 2, and it will be observed that the key occupies substantially all of said second pocket save for minor portions along its side edges and bottom end.

Figure 2:
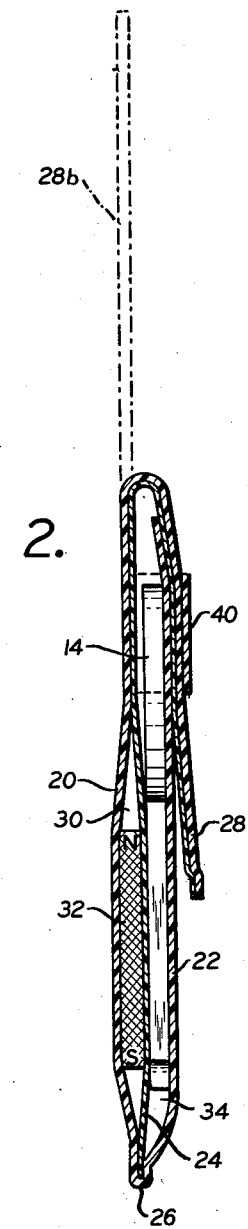
FIG. 2 is an enlarged longitudinal section therethrough taken on the line 2—2 of FIG. 1.

The second pocket may be closed to hold the key in place by simply folding over flap or cover 28 to its solid line positions shown in FIGS. 1 and 2. Said flap or cover may be held in closed position by any suitable means such as a band 40 which extends across the holder, transversely thereof, and is secured thereto along its ends. As appears in FIGS. 1 and 2, said band extends across the front wall 22 of the holder and is welded or otherwise secured thereto along the side edges of said front wall. If desired, said band 40 may be made integral with the front wall. To hold the cover or flap in closed position, all that need be done is slip it under the band in the manner shown in FIG. 2. The key will be held in place without the slightest of its falling out. The key may be removed and replaced by simply reversing the procedure.

Figure 3:
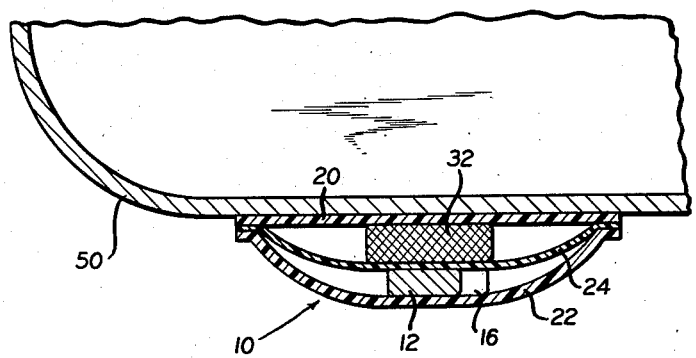
FIG. 3 is an enlarged fragmentary transverse section on the line 3—3 of FIG. 1, showing the device attached magnetically to a ferrous metal part of an automobile.

The use of the present device is illustrated in FIG. 3, where it is shown magnetically attached to a member 50 of an automobile. Said member is intended to be any ferrous metal portion or element suitably located in a hidden or concealed place but sufficiently accessible so that the key holder may be placed thereon and removed therefrom. It appears in FIG. 3 that the key holder is disposed flat against a flat surface, and this will be the usual condition. However, the key holder is made of relatively flexible sheet plastics so as to conform to the configuration or contours of the member to which it is applied. It should be understood, however, that sheet plastics is not the only material of which the holder may be made, other flexible sheet materials being equally available and useful.

The foregoing is illustrative of a preferred form of this invention, and it will be understood that this preferred form may be modified and other forms provided within the basic principles of the invention.

I claim:

A magnetic key holder which is adapted to be supported solely be magnetic attraction on a ferrous metal part of a motor vehicle comprising a unitary holder made of sheet plastics and provided with two pockets, a single magnet being disposed within one of said unitary pockets and being sealed therein, the other pocket being adapted to receive a key, a closure flap for said second pocket being provided by which said pocket may be opened or closed to insert or remove said key, said plastic holder having a front wall, a back wall and an intermediate wall, said walls being made of sheet plastics and being sealed to each other along their respective side edegs, the space between the back and intermediate walls defining the first pocket, the space between the front and intermediate walls defining the second pocket, the sheet plastics of which said holder is made being relatively flexible, and the holder being thereby adapted to flex sufficiently to conform to the contours of a ferrous metal part of a motor vehicle and to absorbe vibrations, thereby preventing dislodgment of said holder from such ferrous metal part when road shock is transmitted through the motor vehicle and a securing band for said closure flap provided across the front wall transversely thereof, said band being secured along its ends to the side edges of said front wall.

References Cited in the file of this patent

UNITED STATES PATENTS

| | | |
|---|---|---|
| 1,211,025 | Wright | Jan. 2, 1917 |
| 2,389,426 | Geffner | Nov. 20, 1945 |
| 2,589,349 | Diefenbach | Mar. 18, 1952 |
| 2,825,447 | Kurland | Mar. 4, 1958 |

FOREIGN PATENTS

| | | |
|---|---|---|
| 544,982 | Italy | June 21, 1956 |